2,867,031

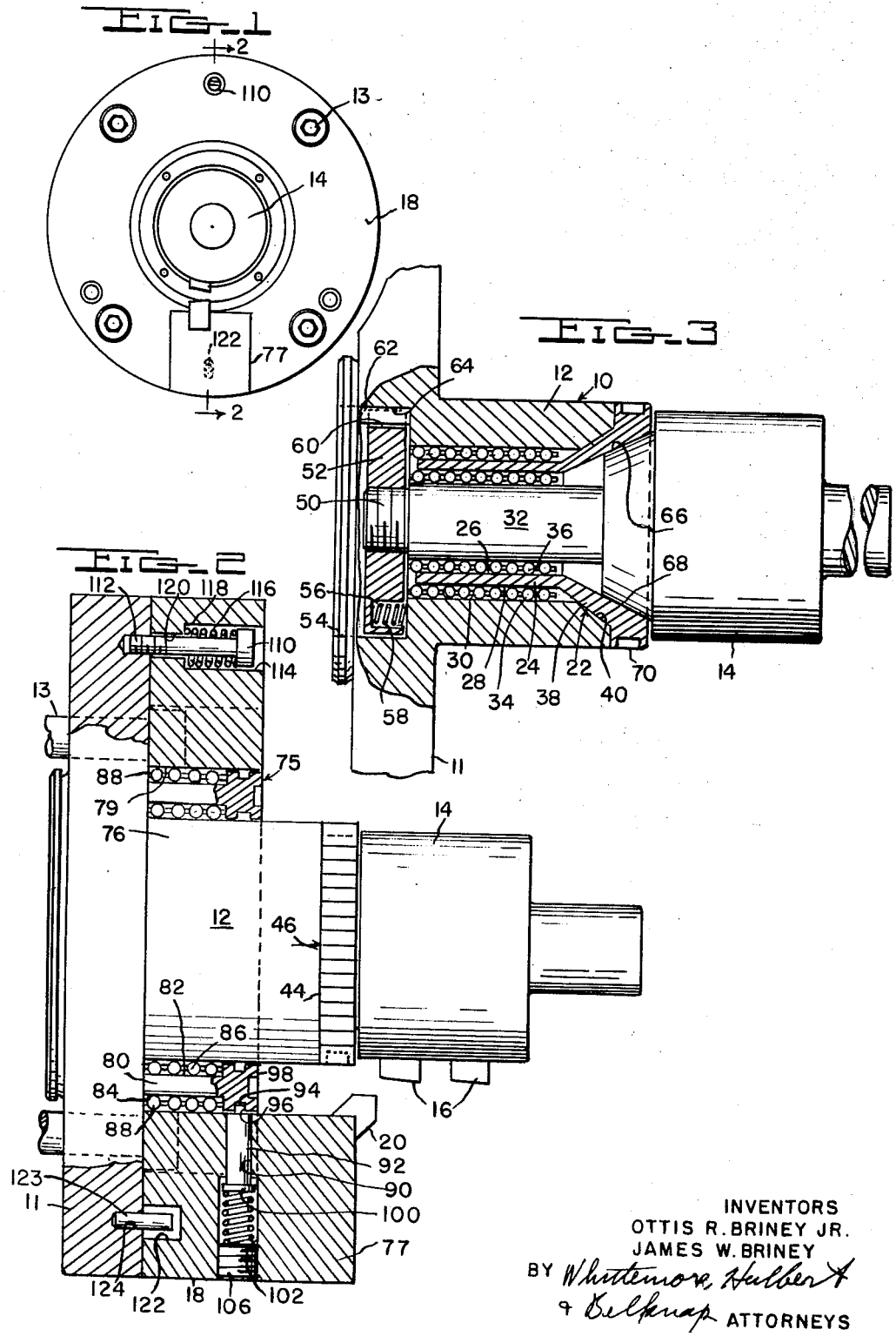
Jan. 6, 1959  O. R. BRINEY, JR., ET AL  2,867,031
COUPLING STRUCTURE
Filed Oct. 22, 1956
INVENTORS
OTTIS R. BRINEY JR.
JAMES W. BRINEY
BY Whittemore, Hulbert
& Belknap ATTORNEYS United States Patent Office 2,867,031
Patented Jan. 6, 1959

COUPLING STRUCTURE

Ottis R. Briney, Jr., and James W. Briney, Pontiac, Mich., assignors to Briney Manufacturing Co., Pontiac, Mich., a corporation of Michigan Application October 22, 1956, Serial No. 617,368

12 Claims. (Cl. 29—105)

The present invention relates to coupling structure, and more particularly to the application of improved coupling structure applicable to tools, and still more particularly, to a combined boring and turning tool.

In accordance with the present invention a tool adapted to be secured to the end of a spindle is provided with means for boring the interior surface of a hole in a work piece and at the same time, turning the outer surface, thus producing an accurately finished cylindrical shell of accurately maintained wall thickness in a single operation.

It is an object of the present invention to provide a combined boring and turning tool providing for extremely small and accurate radial adjustment of the boring and turning blades independently of each other.

It is a further object of the present invention to provide novel means for effecting radial adjustment of a turning tool.

It is a further object of the present invention to provide coupling structure adapted to permit accurate radial adjustment of elements thereof in a manner which maintains the parts in accurate torque transmitting relation without sacrificing the accuracy of adjustment.

More specifically, it is a feature of the present invention to provide for radial adjustment of a turning tool by means which comprises a support of circular cross-section, an annular bushing having interior and exterior surfaces of circular cross-section which are eccentric to each other, and an annular tool holder having an opening of circular cross-section therein, together with means for effecting angular adjustment of the bushing to provide generally radial adjustment of the tool holder relative to the support.

Other objects and features of the invention will become apparent as the description proceeds, especially when taken in conjunction with the accompanying drawings, wherein:

Figure 1 is an end view of the combined boring and turning tool.

Figure 2 is a side elevational view partly in section.

Figure 3 is a side elevational view with parts removed and the remaining parts in section.

The combined tool comprises a support body 10 including a plate or flange 11, and a forwardly projecting cylindrical post 12. The flange 11 is adapted to be bolted or otherwise secured to the end of a spindle by means such for example as the bolts indicated at 13. The support body 10 is adapted to support a boring bar 14 having cutting blades 16 carried thereby, and also to support an annular turning tool holder 18 adapted to support the turning blades 20. Means are provided for supporting both the turning and boring blades rigidly in positions of extremely accurate adjustment and to permit these blades to be moved into the positions of accurate adjustment in such a way that they are not subject to deflection before a subsequent cutting operation. This is accomplished by eliminating the necessity for separately clamping the holders in adjusted positions.

Referring first to the means for effecting radial or substantial radial adjustment of the boring blades 16, this mechanism may be substantially as disclosed in Briney Patent 2,558,815 granted July 3, 1951. For completeness, it is shown herein as comprising an eccentric sleeve or bushing indicated generally at 22 having a generally cylindrical portion 24 the interior surface 26 of which is slightly eccentric with respect to the exterior cylindrical surface 28. The cylindrical portion of the bushing is received in an annular space defined by an internal cylindrical surface 30 formed in the post 12 and the cylindrical surface 32 of the shank of the boring bar 14. Preloaded ball bearings indicated generally at 34 and 36, are provided for supporting the eccentric bushing 22 for substantially free rotational adjustment without any clearance or backlash.

The bushing 22 includes a generally conical portion 38 the conical exterior surface of which engages in centering relation on a conical surface 40 adjacent the end of the generally cylindrical post 12 of the support body 10.

As best seen in Figure 2, the exterior surface of the bushing may be provided with graduations as indicated at 44, and an indicating pointer 46 provided on the forward edge of the post 12 to provide an indication of the adjustment of the boring bar.

At its inner end the shank of the boring bar is threaded as indicated at 50 and has firmly secured thereto a nut 52. The nut is received in a radial enlargement 54 provided in the body 10 and is provided with pockets 56 receiving compression springs 58. At one point the nut 52 is recessed as indicated at 60 and receives a driving key 62 which is partly received in the radially outwardly extending recess 64 formed in the body 10.

Springs 58 exert a force urging the boring bar to the left, as seen in Figure 3, thus causing conical surfaces 66 thereon to engage conical surfaces 68 provided at the interior of the bushing. The springs are of sufficient strength to maintain these conical surfaces in firm accurate locating position. Torque is transmitted from the body 10 to the boring bar through the key 62.

Due to the provision of the preloaded bearings 34 and 36 the eccentric bushing 22 may be readily adjusted and for this purpose its outer peripheral surface is provided with recesses 70 for engagement by a spanner wrench. This adjustment may be accomplished without requiring the loosening of any clamping means, and the boring bar remains positively fixed in adjusted position and is ready for cutting as soon as angular adjustment of the bushing is terminated. This is to be contrasted with constructions which require loosening of a part prior to adjustment, followed by tightening of the part in adjusted position. Invariably, such an operation results in movement of the part out of adjusted position during the clamping or tightening operation.

Means including the support body 10 are provided for effecting completely independent adjustment of the turning or facing blades 20. This means, as best seen in Figure 2, comprises an annular eccentric bushing 75 surrounding a cylindrical guide surface 76 provided on the forward cylindrical extension or post 12 of the support body 10. Alternatively, if desired, a separate annular shell may be provided over the post 12 to constitute a race for ball bearings subsequently to be described. Located radially outwardly of the eccentric bushing 75 is the turning tool holder 18 which comprises an annular member having an integral post 77 thereon supporting the turning or facing blade 20. The tool holder 18 is provided with an internal cylindrical surface 79 or if desired, a separate hardened annular sleeve may be provided therein to constitute a race for other ball bearings subsequently to be described. The eccentric bushing 75 is provided with a generally annular flange portion 80 having an internal cylindrical bearing surface 82 and an external cylindrical bearing surface 84, these surfaces being eccentric by a few thousandths of an inch. Disposed in the annular space between the cylindrical surfaces 76 and 82 is a preloaded ball bearing indicated generally at 86, the balls being carried by a cylindrical retainer and dimensioned to be preloaded when inserted. In like manner, a ball bearing indicated generally at 88 is located in the annular space between the surfaces 79 and 84, the balls being carried by a cylindrical retainer and dimensioned to be preloaded in assembly. The arrangement permits angular adjustment of the eccentric bushing 75 in rotation while providing continuous transaxial support for the holder 18.

The holder 18 is provided with a radially extending cylindrical opening 90 in which is received a slidable friction member 92 having a pin 94 received in an annular groove 96 formed in the outer surface of a thickened end portion 98 of the bushing 75. The friction member 92 engages the peripheral surface of the bushing 75 and tends to prevent accidental rotation thereof. The member 92 is provided with a head 100 movable in an enlargement 102 of the opening 90 and is engaged by a compression spring 104 seated against an adjustable spring abutment 106. The arrangement provides for adjustment of the friction between the slide member 92 and the eccentric bushing 75, but in any case the pin 94 prevents axial movement of the bushing.

The annular holder 18 is connected to the plate or flange 11 of the support body by headed screws 110 threaded in tapped recesses 112 in the forward face of the plate 11, the heads of the screws being received in enlarged openings 114 in the holder and being engaged by compression springs 116 which seat against shoulders at 118. The arrangement is such that the annular holder 18 is pressed firmly against the accurately finished planar forward face of the plate 11 and the rear surface of the holder 18 will be accurately finished to provide for smooth, accurate adjustment. The screw 110 extends through an opening 120 in the holder, the opening being enlarged to provide for limited adjustment thereof.

Means independent of the structure so far described are provided for transmitting torque from the support body 10 to the holder 18 and this means comprises an elongated recess 122 formed in the rear surface of the annular holder 18 and receiving one end of a drive pin 123, the other end of the pin being pressed into an opening 124 at the forward face of the plate 11. The recess 122 is elongated in a generally radial direction to provide for the adjustment of the holder 18 resulting from turning of the bushing 75.

From the foregoing it will be observed that means are provided for supporting both the boring tool and the turning tool rigidly and for effecting positive driving of these tools in a machining operation. At the same time, extremely fine adjustments may be made of the boring and turning tools radially of the axis of rotation. This extremely fine and accurate adjustment is accomplished without the necessity of loosening any clamping elements and the tools are ready for cutting upon movement into adjusted position without the necessity for retightening of clamping elements with the concomitant dislocation of the tools from the adjusted position.

It will be observed that the tools are designed so that the loads imposed thereon during the cutting operation are transmitted to rigid supporting surfaces. At the same time, the construction is such that the adjustment may be accomplished directly and quickly by rotation of the adjusting bushings 22 and 75.

The drawings and the foregoing specification constitute a description of the improved coupling structure in such full, clear, concise and exact terms as to enable any person skilled in the art to practice the invention, the scope of which is indicated by the appended claims.

What we claim as our invention is:

1. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, anti-friction means between said cylindrical post and said bushing and between said bushing and said annular member, key means between said body and member, and means carried by said body pressing said member firmly against said planar surface.

2. Coupling structure comprising a rotary body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, anti-friction means between said cylindrical post and said bushing and between said bushing and said annular member, driving key means between said body and member, and means carried by said body pressing said member firmly against said planar surface.

3. Coupling structure comprising a rotary body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, preloaded ball bearing anti-friction means between said cylindrical post and said bushing and between said bushing and said annular member, driving key means between said flange and member, and means carried by said body pressing said member firmly against said planar surface.

4. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, anti-friction means between said cylindrical post and said bushing and between said bushing and said annular member, key means between said body and member, and resilient means carried by said body pressing said member firmly against said planar surface.

5. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, preloaded ball bearing anti-friction means between said cylindrical post and said bushing and between said bushing and said annular member, key means between said body and member, and resilient means carried by said flange pressing said member firmly against said planar surface.

6. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, anti-friction means between said cylindrical post and said bushing and between said bushing and said annular member, a drive pin carried by said flange, said flange having an elongated slot generally radial of said body receiving said pin and providing for generally radial adjustment of said body by angular adjustment of said bushing while maintaining driving connection between said body and member, and means carried by said body pressing said member firmly against said planar surface.

7. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, anti-friction means between said cylindrical post and said bushing and between said bushing and said annular member, key means between said body and member, headed pins extending forwardly from said flange, enlarged openings through said member receiving said pins and having spring seats adjacent the ends of said opening adjacent said flange, and compression springs surrounding said pins and compressed between the heads of said pins and said spring seats, said openings having lateral clearance with respect to said pins.

8. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, pre-loaded ball bearings between said cylindrical post and said bushing and between said bushing and said annular member, key means between said body and member, and means carried by said body pressing said member firmly against said planar surface.

9. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, pre-loaded ball bearings between said cylindrical post and said bushing and between said bushing and said annular member, a drive pin carried by said flange, said flange having an elongated slot generally radial of said body receiving said pin and providing for generally radial adjustment of said body by angular adjustment of said bushing while maintaining driving connection between said body and member, and means carried by said body pressing said member firmly against said planar surface.

10. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, preloaded ball bearings between said cylindrical post and said bushing and between said bushing and said annular member, key means between said body and member, headed pins extending forwardly from said flange, enlarged openings through said member receiving said pins and having spring seats adjacent the ends of said opening adjacent said flange, and compression springs surrounding said pins and compressed between the heads of said pins and said spring seats, said openings having lateral clearance with respect to said pins.

11. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, anti-friction means between said cylindrical post and said bushing and between said bushing and said annular member, key means between said body and member, means carried by said body pressing said member firmly against said planar surface, said annular member having a generally radially extending opening therethrough in line with said bushing, a friction element movable in said radially extending opening, and adjustable spring means urging said friction member into engagement with the outer surface of said bushing.

12. Coupling structure comprising a body comprising a cylindrical post and a radial flange at one end of said post, said flange having an accurately finished planar surface perpendicular to the axis of said post, an angularly adjustable eccentric bushing surrounding said post, an annular member having a cylindrical opening surrounding said bushing and bearing against said planar surface, anti-friction means between said bushing and said annular member, key means between said body and member, means carried by said body pressing said member firmly against said planar surface, said bushing having at its outer surface an annular groove, said annular member having a radially extending opening in alignment with said annular groove, a friction member movable in said opening including a finger receivable in said groove to prevent relative axial movement between said annular member and said bushing, and resilient means effective to urge said friction member into frictional engagement with said bushing.

References Cited in the file of this patent

UNITED STATES PATENTS

| 2,253,028 | Hassig | Aug. 19, 1941 |
| 2,558,815 | Briney | July 3, 1951 |